United States Patent
Fuchs et al.

[11] Patent Number: 5,526,686
[45] Date of Patent: Jun. 18, 1996

[54] BALANCING MACHINE HAVING AN APPARATUS FOR SENSING GEOMETRICAL DATA OF A ROTARY MEMBER TO BE BALANCED AND A METHOD OF BALANCING A ROTARY MEMBER

[75] Inventors: Andreas Fuchs, Ober-Ramstadt; Klaus Ruhl, Gross-Ostheim; Karl Rothamel, Seeheim-Jugenheim, all of Germany

[73] Assignee: Hofmann Werkstatt-Technik GmbH, Germany

[21] Appl. No.: 300,551

[22] Filed: Sep. 7, 1994

[30] Foreign Application Priority Data

Sep. 7, 1993 [DE] Germany ............... 43 30 287.4
Oct. 26, 1993 [DE] Germany ............... 43 36 509.4

[51] Int. Cl.⁶ ................................................. G01M 1/22
[52] U.S. Cl. ........................ 73/462; 73/487; 73/1 DV; 301/5.22
[58] Field of Search ...................... 73/66, 462, 487; 301/5.21, 5.22, 203.1

[56] References Cited

U.S. PATENT DOCUMENTS 4,341,119  7/1982  Jackson et al. ............... 73/462
4,576,044  3/1986  Boni ............................ 73/462

*Primary Examiner*—Hezron E. Williams
*Assistant Examiner*—Richard A. Moller
*Attorney, Agent, or Firm*—Cushman Darby & Cushman

[57] ABSTRACT

In a balancing machine having an apparatus for sensing geometrical data of a rotary member to be balanced such as a motor vehicle wheel which can be clamped on a main shaft of the balancing machine, the apparatus has a measuring sensor arranged on a support bar of the balancing machine, which is parallel to the main shaft and fixed in its longitudinal direction. The measuring sensor is rotatable about the longitudinal axis of the support bar and has a pivot head which is arranged on the support bar rotatably about the longitudinal axis of the support bar. The sensor also has a measuring sensing lever having a positively guided sensing head, wherein the measuring sensing lever is mounted pivotably on the pivot head and a sensing finger on the sensing head is movable toward and away from the wheel to be sensed, upon a pivotal movement of the measuring sensing lever, in parallel orientation with respect to the main shaft. An angle measuring means is arranged on the pivot head to detect the pivotal angle of the measuring sensing lever relative to the pivot head.

33 Claims, 7 Drawing Sheets

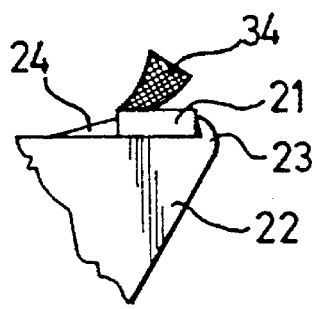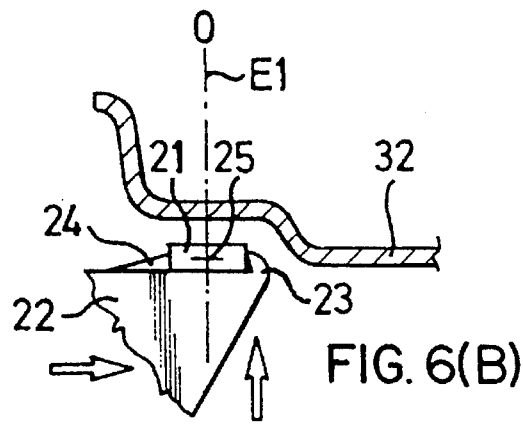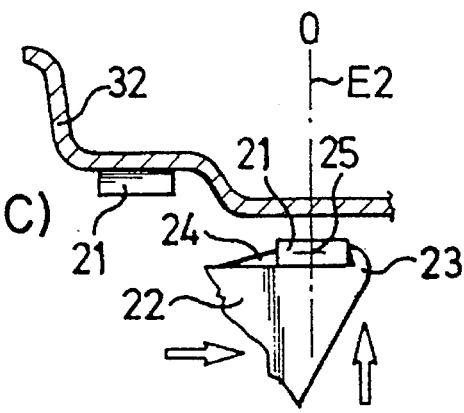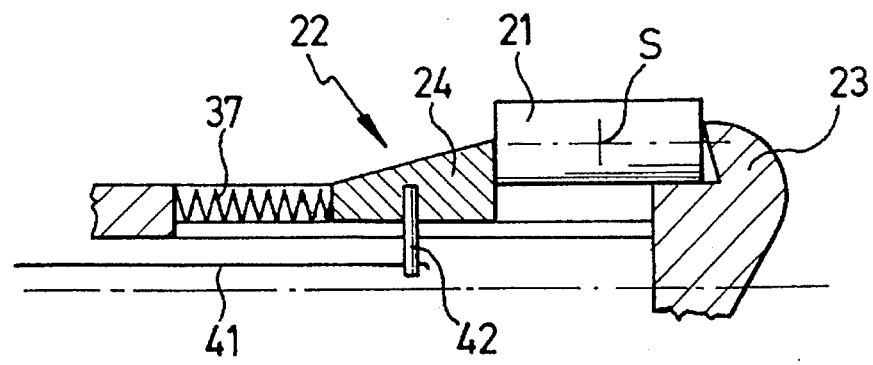

BALANCING MACHINE HAVING AN APPARATUS FOR SENSING GEOMETRICAL DATA OF A ROTARY MEMBER TO BE BALANCED AND A METHOD OF BALANCING A ROTARY MEMBER

BACKGROUND OF THE INVENTION

1. Field of the Invention

To correct unbalance of a rotary member such as a wheel and more especially a motor vehicle wheel, one or more compensating or balancing weights such as adhesive weights can be secured to the rotary member or wheel in an appropriate position as is ascertained by electronic measurement during an unbalance measuring procedure. A form of balancing machine for use in such a method may include an apparatus for sensing geometrical data of the rotary member to be balanced, which can be clamped on a main shaft of the balancing machine, the sensing apparatus having a measuring sensor for the sensing operation, which measuring sensor is carried on a support bar of the balancing machine, which is parallel to the main shaft, with the sensor being rotatable about the longitudinal axis of the support bar.

2. Description of the Related Art

A balancing machine of that kind is known from the Hofmann operating instructions for the Geodyna 88/88 m wheel balancing machine, imprint 9412145-09.86. That machine has a main body structure which carries a left-hand measuring sensor for ascertaining the spacing, relative to the machine, of the left-hand rim flange of a wheel which is clamped in position on the machine, and a right-hand measuring sensor for ascertaining the dimension in respect of the right-hand wheel rim flange. A measuring lever of the right-hand measuring sensor is carried on a separate support or guide bar, pivotably about the longitudinal axis thereof. The support bar is parallel to a fixing axis of a wheel guard hood and is longitudinally movable relative to the main body structure of the balancing machine. For the purposes of width measurement, that is to say for sensing the right-hand side of a rim of a wheel which is clamped in position, more specifically the right-hand balancing plane of the wheel rim, the measuring lever is moved with its measuring finger into a measurement position by the measuring lever being moved with the support bar lengthwise towards the rim and being rotated about the longitudinal axis of the support bar.

In another method of compensating for unbalance on a motor vehicle wheel, as described in German patent application No P 42 29 865.2 corresponding to U.S. patent application Ser. No. 08/115,779, a sensing apparatus which is in the forth of a sensing lever or sensing bar is employed for mechanically sensing dimensions of the wheel rim and for moving the balancing weight into its balancing position on the wheel. That sensing apparatus is carried on the main body structure of the balancing machine but it may be used only for sensing the wheel rim at the machine side, that is to say, on the left-hand side of the wheel when viewing it from the front.

Another procedure as described in German published specification (DE-AS) No 2 001 972 or the above-mentioned Hofmann operating instructions for the Geodyna 88/88 m wheel balancing machine, imprint 9412145-09.86, involves ascertaining dimensions in particular in the rim region of a motor vehicle wheel, by means of a sensing apparatus, and storing such dimensions in an electronic measuring system. In that way suitable information is supplied to the electronic measuring system for calculating the sizes and angular positions required for the balancing weights which are to be mounted to the disk portion of the motor vehicle wheel at the appropriate balancing planes thereof. In a standard balancing procedure, that is to say when balancing weights are applied to the wheel rim flange or bead portions, it is possible, as disclosed in German laid-open application (DE-OS) No 27 37 524, for the nominal values which are specified on the motor vehicle wheel in respect of the geometrical dimensions thereof to be combined with a correction value, upon being inputted into the storage means of the electronic measuring apparatus, in order thereby to take account of the axial spacing of the center of gravity of the balancing weight, in the respective balancing plane. Reference may also be directed in this respect to German patent application No P 41 22 844 corresponding to U.S. patent application Ser. No 07/910,917 describing a sensing device which makes it possible to accurately ascertain the dimensions of the disk wheel or more specifically the rim portion thereof, in the balancing planes, for the input of those dimensions into the electronic measuring system, prior to carrying out the unbalance measuring operation.

SUMMARY OF THE INVENTION

An object of the present invention is to provide a balancing machine having an apparatus for sensing geometrical data on rotary bodies to be balanced, such as motor vehicle wheels, which is of a simplified structure while affording improved data detection.

Another object of the present invention is to provide a balancing machine having means for sensing geometrical data of a rotary member to be balanced thereon, which is quick and simple to operate while affording reliable operational results.

A further object of the present invention is to provide a balancing machine with means for sensing geometrical data of the rotary member to be balanced thereon, which can afford a high degree of accuracy in regard to fitting balancing weights to the rotary member to be balanced.

Still a further object of the present invention is to provide a method of compensating for unbalance on a rotary member such as a wheel in which fitting of at least one balancing weight in an appropriate balancing position is facilitated.

In accordance with the principles of the present invention, in a first aspect, the foregoing and other objects are achieved by a balancing machine having an apparatus for sensing geometrical data of a rotary member to be balanced, such as a motor vehicle wheel, which can be clamped on a main shaft of the balancing machine. The apparatus has a measuring sensor for the sensing operation, the measuring sensor being carried on a support bar of the balancing machine, which is parallel to the main shaft. The measuring sensor is rotatable about the longitudinal axis of the support bar. The measuring sensor has a pivot head which is arranged on the support bar rotatably about the longitudinal axis thereof, the support bar being fixed in its longitudinal direction. The measuring sensor further comprises a measuring sensing lever having a positively guided sensing head, the lever being mounted pivotably on the pivot head while a sensing finger disposed on the sensing head is movable towards and away from a rotary member such as a wheel to be sensed, upon a pivotal movement of the measuring sensing lever, in parallel orientation with respect to the main shaft. The measuring sensor further comprises an angle measuring means disposed on the pivot head and adapted to detect the pivotal angle of the measuring sensing lever relative to the pivot head.

As will be seen in greater detail hereinafter therefore the invention provides for a measuring sensor in a sensing apparatus, the measuring sensor having a sensing finger which can be rotated and pivoted to any suitable measurement positions on the wheel rim, without requiring parallel displacement of a guide or support bar. By virtue of the specific design configuration of the measuring sensing lever with positive guidance of the sensing head, the sensing finger always remains in parallel orientation with respect to the main shaft so that, by way of the pivot angle, the position of balancing planes and possibly the wheel rim width or other dimensions in the longitudinal direction of the main shaft can be accurately ascertained by using the angle measuring means and an evaluation system.

In accordance with a preferred feature of the invention an advantageous arrangement is one in which the longitudinal axis of the support or holding bar and the axis of rotation of a wheel guard hood which can be pivoted over a wheel clamped on the machine are the same. In that way the specific mounting means required in a conventional sensing apparatus for supporting the measuring sensor, more specifically in the form of the guide bar which is complicated and expensive, can be eliminated as the arrangement for holding the wheel guard hood, for example a tube or a rotatable bar, is also used for fixing the measuring sensor. That affords a compact and inexpensive design configuration for the measuring sensor.

In accordance with another preferred feature the measuring sensor may have a resetting means for resetting the pivoted measuring sensing lever and/or the rotated pivot head. The resetting means which at the same time can provide for relief of the load of the weight of the measuring sensing lever, for a for example horizontal rest or initial position, makes the arrangement easier to operate as a machine operator no longer has to perform the task of returning the measuring sensor into the protected initial or rest position, whereby possible damage can also be prevented.

In another preferred feature the resetting means includes one or more springs for producing the resetting force, for example a leg spring between the pivot head and the measuring sensing lever, the spring or springs producing both the resetting force and also the force which relieves the load of the weight of the measuring sensing lever. It is however also possible to use hydraulic force-producing means.

In accordance with another preferred feature the angle measuring means may have an arcuate toothed segment coupled to the measuring sensing lever, for driving a toothed gear of a potentiometer. The parts of the angle measuring means can be arranged within the pivot head in a position where they are protected from environmental influences.

The measuring sensor can be arranged at the left-hand side on the above-mentioned wheel guard hood and near the main body structure of the balancing machine, for measuring the one side of the wheel rim, or on the right-hand side of the wheel guard hood, being the side remote from the balancing machine, for measuring the oppositely disposed other side of the wheel rim. When the measuring sensor is arranged on the left-hand side, for example on the holding or support bar of the wheel guard hood in the spacing between the wheel guard hood and the main body structure of the balancing machine, the measuring sensor according to the invention replaces the conventional measuring sensor which is disposed on the main body structure of the machine and which is restricted in terms of its function. Likewise the measuring sensor can be disposed at the right-hand side free end of the holding or support bar, for measuring a rim of a wheel clamped on the measuring machine, at the side thereof which is the right-hand side when viewing the arrangement from the front.

Preferably the angle measuring means includes a measuring means for determining the rotary movement of the pivot head about the longitudinal axis of the holding or support bar. In that way the data or co-ordinates of any point measured on the wheel rim, and also the diameter, can be determined by means of the known length of the measuring sensing lever (or the pivotal arms thereof), as well as the ascertained angles of pivotal and rotary movements.

In another preferred feature the measuring sensor may include drive means which are operated by a control means, for rotating the pivot head and for pivoting the measuring sensing lever. The measuring sensor can be moved in a specific and controlled fashion to appropriate measurement points by operation of the drive means, for example electric motors, which act in the usual way on the pivot head and the measuring sensing lever by way of a gear arrangement or a belt system. Thus, the measuring sensor can actively retrieve balancing positions which are ascertained in an unbalance measuring run, being the positions which are appropriate for fitting balancing weights, the balancing positions being retrieved by a procedure whereby the sensing finger is rotated and pivoted to the balancing position, after the wheel has been turned into a suitable angular position.

Preferably the sensing finger has a holder for a balancing weight. The sensing finger can be of the configuration like that described in the specific embodiment set forth hereinafter, which includes a clamping device for receiving and positioning an adhesive weight. After the sensing finger has been moved to a suitable balancing position, the adhesive weight can be disposed in its balancing position. That increases the level of accuracy of the weight arrangement and reduces the possibility of incorrect actuation by the machine operator.

The measuring sensing lever may be of various different design configurations. Thus in a preferred feature it can be in the form of first and second at least substantially mutually parallel pivot arms which form a parallelogram assembly on the one hand by virtue of the way in which they are carried on the pivot head and on the other hand by virtue of their pivotal connection by way of the sensing head, so that the pivotal arms permit the sensing finger to be guided in a direction parallel to the main shaft of the balancing machine. The measuring sensing lever may also have a Bowden cable arrangement which provides for guiding the sensing finger, together with the measuring sensing lever. The measuring sensing lever may alternatively have a cable with a compression spring or a pushrod with a tension spring, for guidance of the sensing finger parallel to the main shaft of the machine.

Preferably the holding or support bar is hollow, for example in the form of a tube, so that connecting lines of the angle measuring means can be passed therethrough. In that way they are protected from damage.

In accordance with the principles of the present invention, in a further aspect thereof, the above-specified and other objects are achieved by a method of unbalance compensation on a rotary member such as a motor vehicle wheel by means of one or more balancing weights, such as adhesive weights, which are fixed to the disk wheel portion or the rim of the wheel at given positions which are determined by an electronic measuring system during an unbalance measuring operation. In the unbalance compensation operation a sensing apparatus which is coupled to the electronic measuring system is used for arranging the respective balancing weight in the correct position on the disk wheel or the rim, the sensing apparatus being operable to sense one or more disk wheel dimensions for storage in the electronic measuring or evaluating system, for evaluation of the measurement values obtained in the unbalance measuring operation. The sensing apparatus comprises a measuring sensor having a pivot head arranged on a support or holding bar which is fixed in the longitudinal direction, the pivot head being rotatable about the longitudinal axis of the support bar. The sensing apparatus further includes a measuring sensing lever having a positively guided sensing head, wherein the measuring sensing lever is mounted pivotably on the pivot head and a sensing finger which is arranged on the sensing head is movable towards and away from a wheel to be sensed, upon pivotal movement of the measuring sensing lever, in parallel orientation with respect to the main shaft. The sensing apparatus further includes an angle measuring means arranged on the pivot head and adapted to detect the pivot angle of the measuring sensing lever with respect to the pivot head.

It will be seen therefore that, in that procedure, the sensing apparatus which is coupled to the electronic measuring system and which was used prior to or after execution of the unbalance measuring operation for storing in the electronic measuring system the corresponding disk wheel or rim dimensions which are to be taken into account when the measurement values are evaluated, is utilized to facilitate the unbalance compensation procedure, that is to say fitting the respective balancing weight to the disk wheel in the correct position in the respective balancing plane. That therefore provides for a higher degree of accuracy when fitting in particular adhesive-type weights in the different balancing planes which vary according to the respective type of disk wheel or rim configuration. In that respect the degree of accuracy can be increased in particular by virtue of the fact that there is an exact correlation between the balancing plane which is sensed by the sensing apparatus prior to or after the unbalance measuring operation, and the effective balancing radius, which is also sensed, for evaluation of the measurement values (this takes place in the sensing mode) and the balancing plane which is to be ascertained on the disk wheel when arranging the respective balancing weight in the correct position thereon, by way of the balancing plane position which is stored in the electronic measuring system (this is the retrieval mode). The above-mentioned correlation is utilized by means of the sensing apparatus in the balancing operation.

In that respect it is possible to facilitate retrieval of the balancing plane position which was stored in the electronic measuring system prior to or after execution of the unbalance measuring operation. That can be effected by a procedure whereby the sensing apparatus which may be in the form for example of a sensing bar, sensing lever or the measuring sensing lever according to the invention is moved to the previously measured balancing plane and the respective distance of the sensing tip of the measuring sensing lever or of the center of gravity, which is operative in the unbalance compensation operation, of the balancing weight, from the balancing plane to be retrieved, is rendered visible or audible by suitable signals. In that operation, the respective distance still remaining to the balancing plane to be retrieved can be indicated digitally or in some other fashion. When the balancing plane being sought is retrieved, an optical or an acoustic signal can indicate to the operator that the balancing plane which is being sought or which is to be retrieved has been reached, by the sensing apparatus.

In that connection, after the unbalance measuring runs have been carried out and after display of the measuring run, for positioning of the one or more balancing weights such as adhesive weights on the disk wheel or on the wheel rim flanges, the sensing apparatus which is for example as described in above-mentioned German patent application No P 41 22 844 corresponding to U.S. patent application Ser. No. 07/910,917 or which is of a configuration in accordance with the measuring sensor of the present invention can be moved out of its rest position, thereby actuating a switch which is adapted to switch the electronic measuring or evaluating system of the balancing machine to the operating mode of 'retrieval of the balancing planes' (referred to for the sake of brevity as the retrieval mode). The arrangement can be switched over in that way by a manually actuable switch, for example a pushbutton switch, or a similar actuating member. The arrangement can also be switched over automatically in the course of an operational procedure program or by a control movement of the sensing apparatus.

In the retrieval mode the respective distance of the sensing apparatus, or more specifically the measuring sensing finger, relative to the balancing plane to be found, is displayed for example in millimeters. In a dynamic unbalance compensating operation, for that purpose for example firstly the distance relative to the left-hand balancing plane can be displayed. When the balancing apparatus, for example with its sensing tip, or the center of gravity of the balancing weight which is held in the sensing apparatus, has reached the required balancing plane, the distance display is zero and that display can be further supported and enhanced by for example an acoustic signal.

When, as the sensing apparatus or sensing finger moves in a direction towards the right-hand balancing plane, it passes beyond the center between the two balancing planes, a distance display is effected in relation to the right-hand balancing plane, in other words, the distance of the sensing apparatus from the right-hand balancing plane is displayed on the balancing machine. Attainment of the right-hand balancing plane can also again be displayed both by a distance display of zero and also by virtue of a for example acoustic signal.

As soon as the respective balancing plane has been reached by the sensing apparatus or the center of gravity of the weight fixed to the sensing apparatus, the wheel can be turned into the appropriate balancing position, referred to as the balancing annular position. That can be assisted in the usual manner by virtue of indicator arrows, as described in above-mentioned Hofmann operating instructions on the Geodyna 88/88 m wheel balancing machine.

It is also possible to measure accurately the balancing plane and the effective diameter of a balancing weight which is to be mounted on the wheel rim shoulder or in the rim dish portion (in that case the weight is concealed in the rim structure). For that purpose, prior to the unbalance measuring operation, the inside dimensions or inside diameter of the disk wheel, at the rim, are sensed in the respective balancing plane by a procedure wherein a balancing weight is arranged between the inside dimension to be sensed and the sensing apparatus (more specifically the sensing tip, the respective position of which is detected by the measuring or evaluation system). For that purpose the balancing weight which can be for example an adhesive weight is fitted into a holder disposed at the tip of the sensing apparatus. In this case the balancing weight is then used as a sensing surface.

That makes it easier to ascertain the optimum balancing plane. The holder on the sensing apparatus, for carrying the balancing weight, is used for measuring off the optimum balancing plane and the effective diameter at which the center of gravity of the balancing weight to be fitted takes effect. In that respect, the adhesive weight is fitted by means of the sensing apparatus precisely in the balancing plane in which, during the unbalance compensation operation, the balancing weight is to be fitted, more specifically by being glued in position. The size of the balancing weight is ascertained by a suitable measuring operation. In that sensing procedure, the reference point used is therefore not the sensing tip of the sensing apparatus but the weight which is fitted into the holder and which thus serves as a reference weight. A suitable circuit arrangement for taking account of the dimensions of the balancing weight in regard to the effective position of the center of gravity thereof is described in above-mentioned German laid-open application (DE-OS) No 27 37 524 to which attention may therefore be suitably directed. For transfer of the sensed dimensions, the sensing apparatus with the reference weight fitted thereto can be held in the desired position for a given period of time, for example two seconds, and then transfer of the sensed dimensions into the storage means or memory of the electronic measuring or evaluating system can be indicated by the production of a signal, for example an acoustic signal. In that way, it is possible to sense and input into the electronic measuring system not only balancing planes which are predetermined by virtue of specific balancing modes (involving positioning weights), but any balancing planes which permit optimum positioning of the balancing weights. When the procedure involves a plurality of predetermined balancing modes, for example five predetermined balancing modes which are predetermined in particular when balancing light alloy wheels by means of adhesive weights, it is possible to provide for optimum sensing of balancing planes, in which case the location to be sensed is clearly indicated by a display, as will be described in greater detail hereinafter in connection with the unbalance compensation operation (balancing mode). In that respect it is also possible for the position of the center of gravity of the balancing weight to be caused to coincide with the respective balancing plane.

By virtue of the balancing mode being clearly indicated in that way, the operator is given an indication in regard to the location to be sensed on the disk wheel, in particular in the region of the wheel rim, both when sensing the wheel dimensions for input prior to the unbalance measuring operation, as already discussed above, but also in the actual unbalance compensation operation by virtue of fitting the balancing weights. For that purpose, connected to the electronic measuring system is a display device which reproduces a rim cross-section with the respectively possible balancing planes, for example in the form of weight symbols. During the sensing operation, which can be referred to as the sensing mode, a respective balancing plane which is intended for a selected balancing mode is indicated by a signal, for example by flashing of the above-mentioned weight symbol, during the sensing operation. When the sensing apparatus has reached the indicated balancing plane on the wheel, the flashing display stops. In that way the operator is given an indication in respect of the balancing planes to be sensed on the wheel and more especially the rim thereof. In that respect, it is possible to sense five separate balancing planes which have been indicated by means of weight symbols. The display of the balancing plane which is to be sensed on the wheel can begin when the sensing apparatus is moved out of its rest position. In that way a switch can be actuated, to bring the display into operation. That display may involve for example flashing of the corresponding weight symbol at the appropriate position on the image of the rim or the rim cross-sectional configuration, which is included in the display. The display only ever indicates one balancing plane, by flashing of an appropriate weight. When the sensing finger of the sensing apparatus reaches the identified balancing plane, that can be indicated by means of for example an acoustic signal. The display then goes out. If a dynamic balancing operation is being carried out, the second balancing plane is identified in the same fashion. For effecting dynamic balancing, the two balancing planes to be sensed are thus displayed or indicated in succession so that there is no possibility of any confusion between them.

The procedure involved when fitting the balancing weights in the balancing mode can be considerably simplified, from the point of view of the operator, if the sensing apparatus can be fixed in given sensing positions. In particular the sensing apparatus can be fixed in position when it has reached a respective balancing plane. When the sensing apparatus is moved in an axial direction at least substantially parallel to the support spindle of the balancing machine, such movement can be blocked to fix the sensing apparatus in the appropriate position. When the movement of the sensing apparatus is produced by axial extension of the sensing apparatus, the sensing apparatus can be fixed in the appropriate position by blocking such extension. That can be effected by means of a clamping device which can be actuated manually or which can be operated by the electronic measuring system. Particularly in the retrieval mode, that considerably facilitates the operation of fitting the balancing weights, from the point of view of the operator. However the fact that the axial movement of the sensing apparatus or the measuring sensing finger can be fixed or blocked in that way can also be advantageous when measuring and storing the disk wheel dimensions, in the sensing mode. The above-mentioned clamping device can be of a mechanical nature, for blocking angular pivotability of the measuring sensing lever, for example in the form of a clamping screw, or in the form of an electromagnetic clamping device, the latter preferably being used when the clamping device is operated by the electronic measuring system. The greater ease of arranging the balancing weights in the correct positions is enjoyed not only in regard to dynamic balancing but also in regard to static balancing.

Further objects, features and advantages of the present invention will be apparent from the following description of preferred embodiments.

BRIEF DESCRIPTION OF THE DRAWING

FIGS. 6(A)–6(C) are a diagrammatic view of a weight fitting operation using the sensing apparatus, FIG. 7 is a diagrammatic view of a sensing apparatus for sensing the weight dimensions.

DESCRIPTION OF PREFERRED EMBODIMENTS

Figure 1:
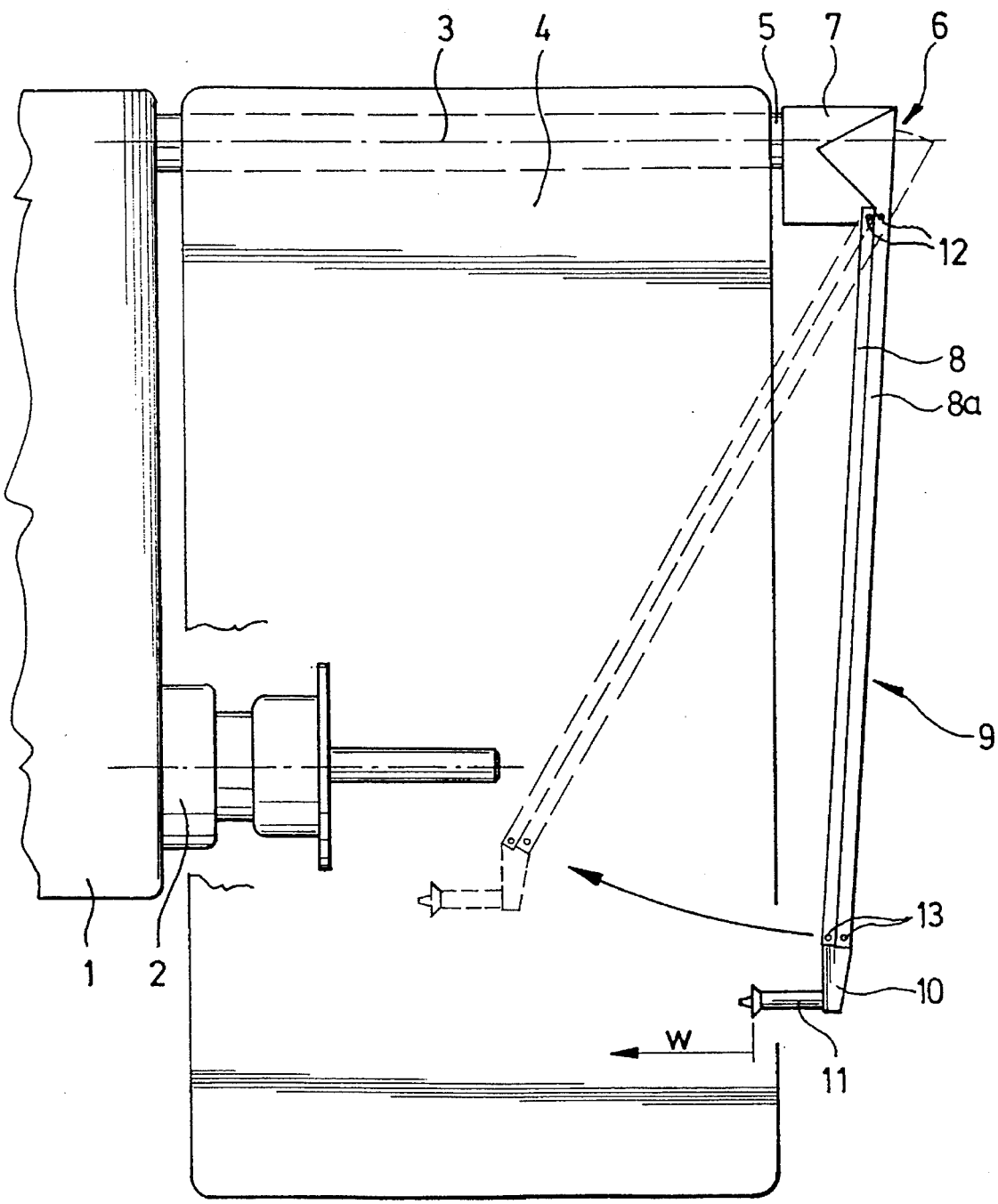
FIG. 1 is a diagrammatic plan view of a measuring sensor according to the invention on a balancing machine.

Referring firstly to FIG. 1, shown therein is a part of a wheel balancing machine comprising a main body structure 1 and a main shaft 2 on which a motor vehicle wheel (not shown) constituting a rotary member to be balanced can be clamped. An axis of rotation 3 of a wheel guard hood 4 is shown parallel to the main shaft 2 in a rear part of the balancing machine, which part is remote from the machine operator. The axis of rotation 3 can be provided by a mounting tube or a support or holding bar 5. The wheel guard hood 4 is pivotable or rotatable about the axis of rotation 3 from an upwardly pivoted open position in which a wheel clamped on the main shaft 1 is accessible, into a downwardly pivoted closed position in which the wheel is therefore covered and the operator is protected from pieces or parts which may possibly come loose in the course of rotation of the wheel, for example dirt, stones which are jammed in the tire tread profile, or loosened balancing weights.

Arranged on the part of the support bar 5 which projects beyond the width of the guard hood 4 is a measuring sensor 6 for sensing a balancing plane at the rim of the wheel, or possibly for sensing the rim dimensions. The measuring sensor 6 includes a pivot head 7, a measuring sensing lever 9 which is formed from two at least substantially parallel pivotal arms 8 and 8a, and a sensing head 10 with a sensing finger 11. The pivot head 7 is fixed on the support bar 5 in the longitudinal direction and is mounted rotatably about the axis of rotation 3 which is the longitudinal axis of the bar 5. The two pivotal arms 8 and 8a are mounted on the one hand to the pivot head 7 pivotably about two spaced-apart parallel axes of rotation 12 directed perpendicularly to the longitudinal axis 3 of the support bar 5, and on the other hand they are mounted to the sensing head 10 at two parallel spaced-apart axes of rotation 13 so that the two pivotal arms 8 and 8a are pivotable in a parallelogram-like assembly in a plane which passes through the longitudinal axis 3 or which extends parallel or is inclined relative thereto. That means that the angle of pivotal movement of the pivotal arms 8 and 8a relative to the pivot head 7 is transmitted to the sensing head 10 so that the sensing head 10 with the sensing finger 11, irrespective of the respective angle of pivotal movement, remains unchanged in regard to its orientation relative to the common axis 3 of the support bar 5 and thus in relation to the main shaft 2 which is parallel thereto, in other words, the longitudinal axis of the sensing finger 11, which is parallel to the main shaft 2, is always in parallel orientation relative thereto.

The arrangement and the spacing of the respective axes 12 and 13 of the pivotal arms 8 and 8a on the pivot head 7 and the sensing head 10 respectively are so selected that a pivotal movement of the pivotal arms 8 and 8a, which is adapted to the parameters in regard to different wheel and rim sizes, is possible at least as far as about a 45° angle of pivotal movement out of the perpendicular, relative to the longitudinal axis of the support bar 5, as is indicated in FIG. 1 by the position shown by way of example with the broken-line representation of the measuring sensing lever 9.

Figure 2:
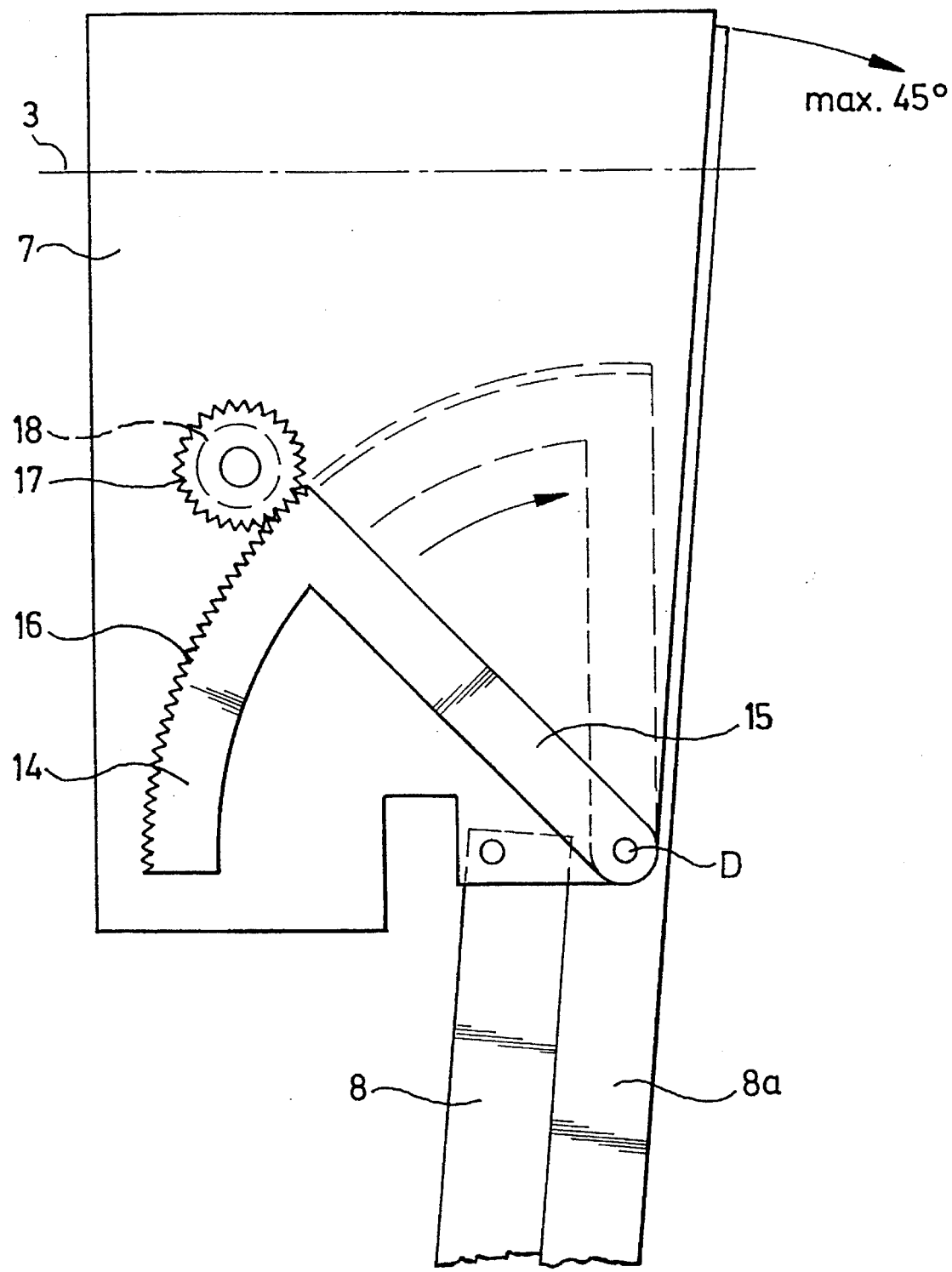
FIG. 2 is a diagrammatic view of a pivot head of the measuring sensor.

Looking now also at FIG. 2, an arcuate toothed segment 14 is carried by way of a segment holder 15 on one of the pivotal arms 8 and 8a, more specifically being the right-hand pivotal arm 8a in the construction shown in FIG. 2. When the pivotal arms 8 and 8a pivot, the toothed segment 14 and the holder 15 move with the arms 8 and 8a about the common axis of rotation D. A tooth configuration 16 on the outside arcuate surface of the toothed segment 14 is in engagement with a toothed gear 17 which is coupled to a rotary potentiometer 18. The radius of the toothed segment 14 and the radius of the gear 17 of the potentiometer 18 are such that, in the illustrated embodiment, the angle of pivotal movement of the pivotal arm 8a is transmitted to the potentiometer 18 with a transmission ratio of i=7.12. The measurement travel of the pivotal arms 8 and 8a, which is parallel to the main shaft 2 and which is indicated by reference w in FIG. 1, is calculated by means of simple geometrical relationships by any suitable evaluating system which is of known type and which therefore does not need to be described in greater detail herein, by way of electrical signals which are generated at the potentiometer 18 and which correspond to given angles of pivotal movement of the pivotal arms 8 and 8a. The position of a balancing plane on a wheel to be balanced and possibly the width of a wheel rim can be ascertained by means of the measurement travel w.

At least one spring may be disposed between the two pivotal arms 8 and 8a or between the pivot head 7 and the pivotal arm or arms 8, 8a. The spring acts in opposition to movement of the pivotal arms 8 and 8a out of an initial or rest position in which for example they are perpendicular. Then, after sensing a point to be measured such as the right-hand wheel rim flange or a balancing plane, with the sensing finger 11, the pivotal arms 8 and 8a move back into their starting position under the effect of the spring force.

The arrangement of the pivot head 7, being rotatable about the longitudinal axis of the support bar 5, permits a rotary movement of the sensing head 10 on circular paths in planes which are perpendicular to the longitudinal axis 3, the radius of the circular paths being dependent on the respective angle of pivotal movement of the pivotal arms 8 and 8a. That therefore ensures that the sensing finger 11 can be positioned at the wheel rim flange or other points of the rim, even with different rim widths and diameters, by means of suitable pivotal and rotary movements.

Also arranged at the pivot head 7 is a second angle measuring means (not shown) for measuring the angle of the rotary movement of the pivot head 7 about the longitudinal axis 3 of the support bar 5. For that purpose the second angle measuring means may have an assembly consisting of a toothed wheel and potentiometer which is of a similar design configuration to the angle measuring means described above for measuring the angle of pivotal movement of the pivotal arms 8 and 8a. However, it is also possible to adopt other known measuring devices for determining the angles of rotary and pivotal movement. In that way any point to be measured on the wheel rim can be accurately determined. The measurement point data or co-ordinates can then be stored in a suitable measurement value storage means.

In conjunction with the above-indicated drive means for rotating the pivot head 7 and for pivoting the pivotal arms 8 and 8a, and with the sensing finger 11 as a holder for a balancing weight, the operation of positioning the appropriate balancing weight or weights in the balancing operation can be carried out with an enhanced level of accuracy, and the machine operator is thus advantageously assisted in terms of his activity.

Reference will be made at this point to FIGS. 8(A) through (E) showing alternative configurations of the measuring sensing lever 9 of the measuring sensor according to the invention.

Figure 8A:
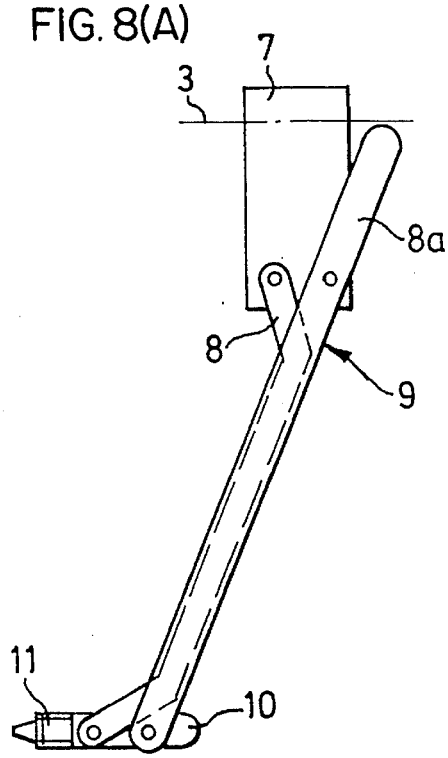
FIG. 8 shows diagrammatic views of different configurations of the measuring sensing lever.

FIG. 8(A) shows first and second pivotal arms 8 and 8a of the measuring sensing lever 9, wherein the one pivotal arm 8 is arranged in such a way as to be sunk into the other pivotal arm 8a which for that purpose for example can be in the form of a U-shaped tubular member.

Figure 8B:
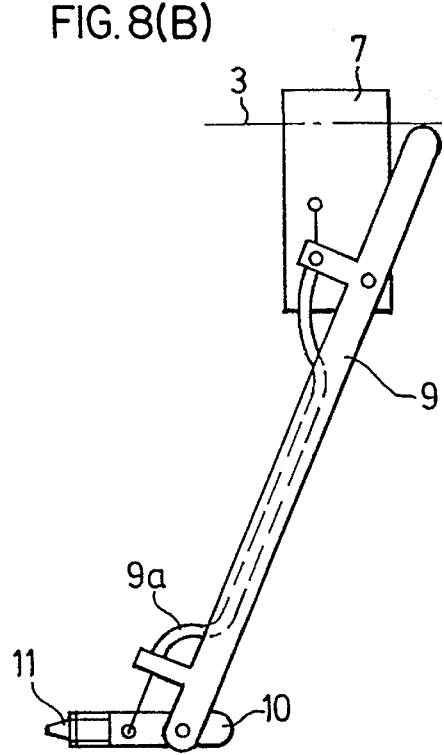

FIG. 8(B) shows a measuring sensing lever 9 on which a Bowden cable assembly 9a is mounted. The internal wire of the Bowden cable assembly 9a is fixed on the one hand to the pivot head 7 and on the other hand to the sensing head 10 so that the sensing finger 11 is held in parallel relationship with the main shaft 2 of the balancing machine upon pivotal movement of the measuring sensing lever 9 in the above-described manner.

Figure 8C:
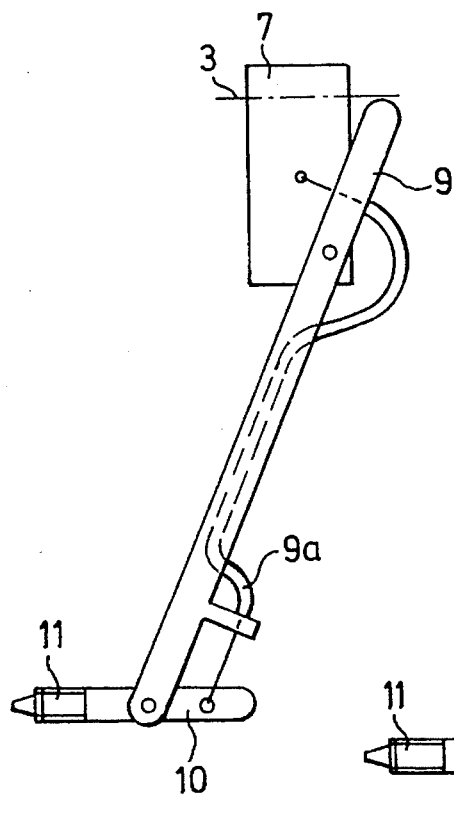

FIG. 8(C) shows a measuring sensing lever 9 as illustrated in FIG. 8(B), but with a modified arrangement of the Bowden cable assembly 9a. The mode of operation involved is the same.

Figure 8D:
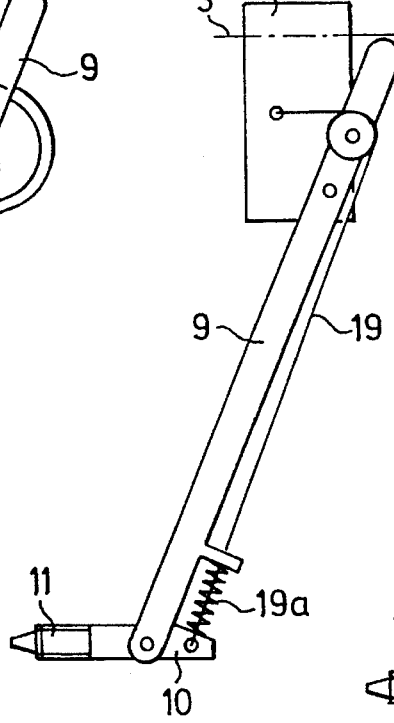

FIG. 8(D) shows a measuring sensing lever 9 along which a cable 19 secured to the pivot head 7 and the sensing head 10 is guided. The sensing finger 11 is guided by a compression spring 19a operatively disposed between the measuring sensing lever 9 and the sensing head 10.

Figure 8E:
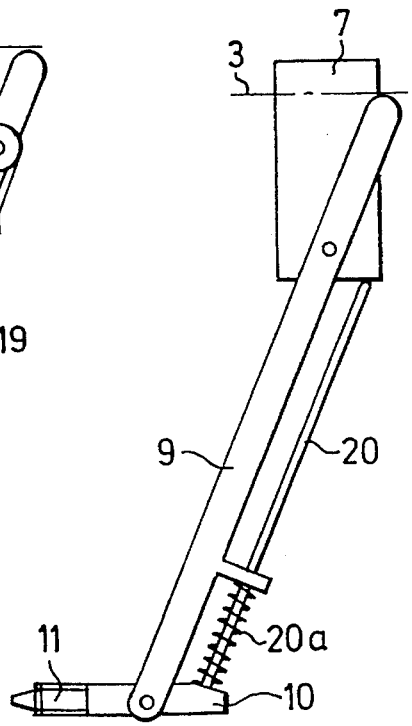

FIG. 8(E) shows a measuring sensing lever 9 having a pushrod 20 and a tension spring 20a for guiding the sensing finger 11.

Figure 9:
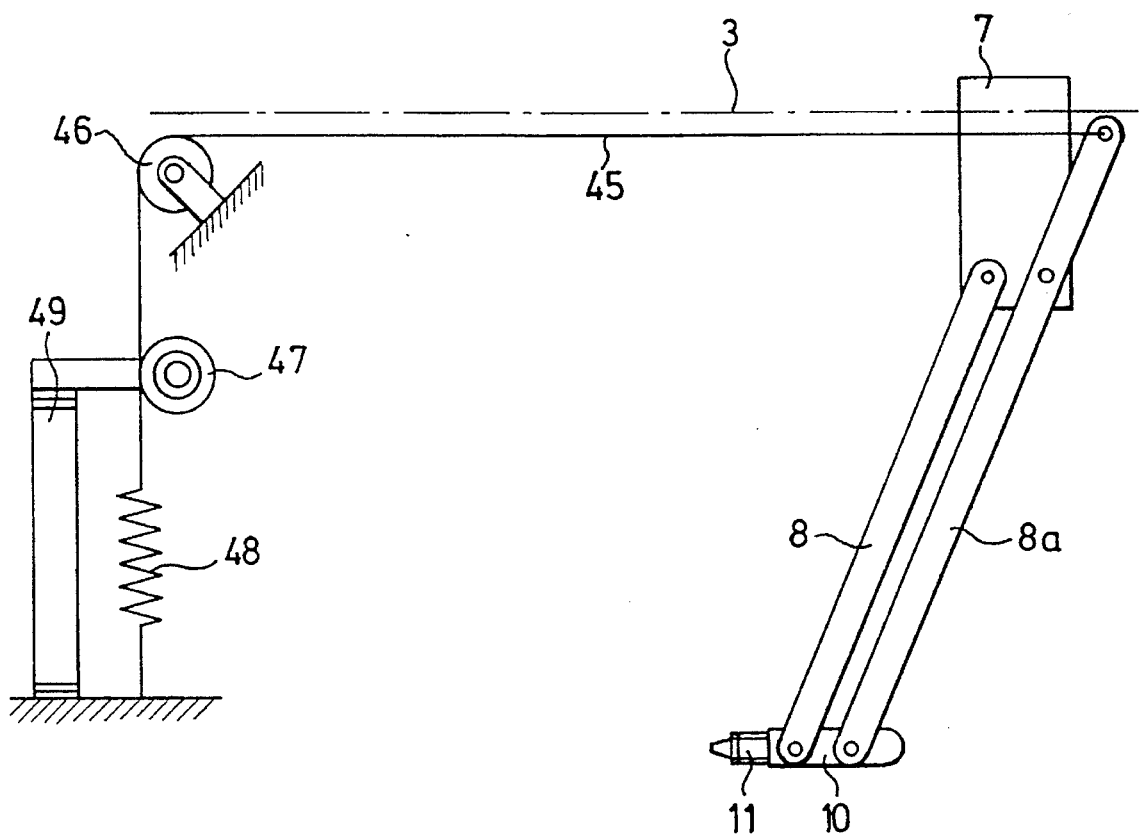
FIG. 9 is a diagrammatic view of a configuration of the measuring sensing lever with a measuring device.

Reference will now be made to FIG. 9 showing a measuring sensing lever 9 in the form of two pivotal arms 8 and 8a, wherein a cable 45 which is fixed to one pivotal arm 8a extends parallel to the axis of rotation 3 around a direction-changing or guide roller 46 and over a cable roller 47 around which it is passed once and which is coupled to a potentiometer. The cable 45 is then connected to a tension spring 48. Upon pivotal movement of the measuring sensing lever 9 the cable 45 and therewith the cable roller 47 are moved so that the angle of pivotal movement of the measuring sensing lever 9 can be detected by means of the potentiometer and an evaluation circuit operatively connected thereto. The cable roller 47 and the potentiometer are held in position by way of two parallel leaf springs 49.

Figure 3:
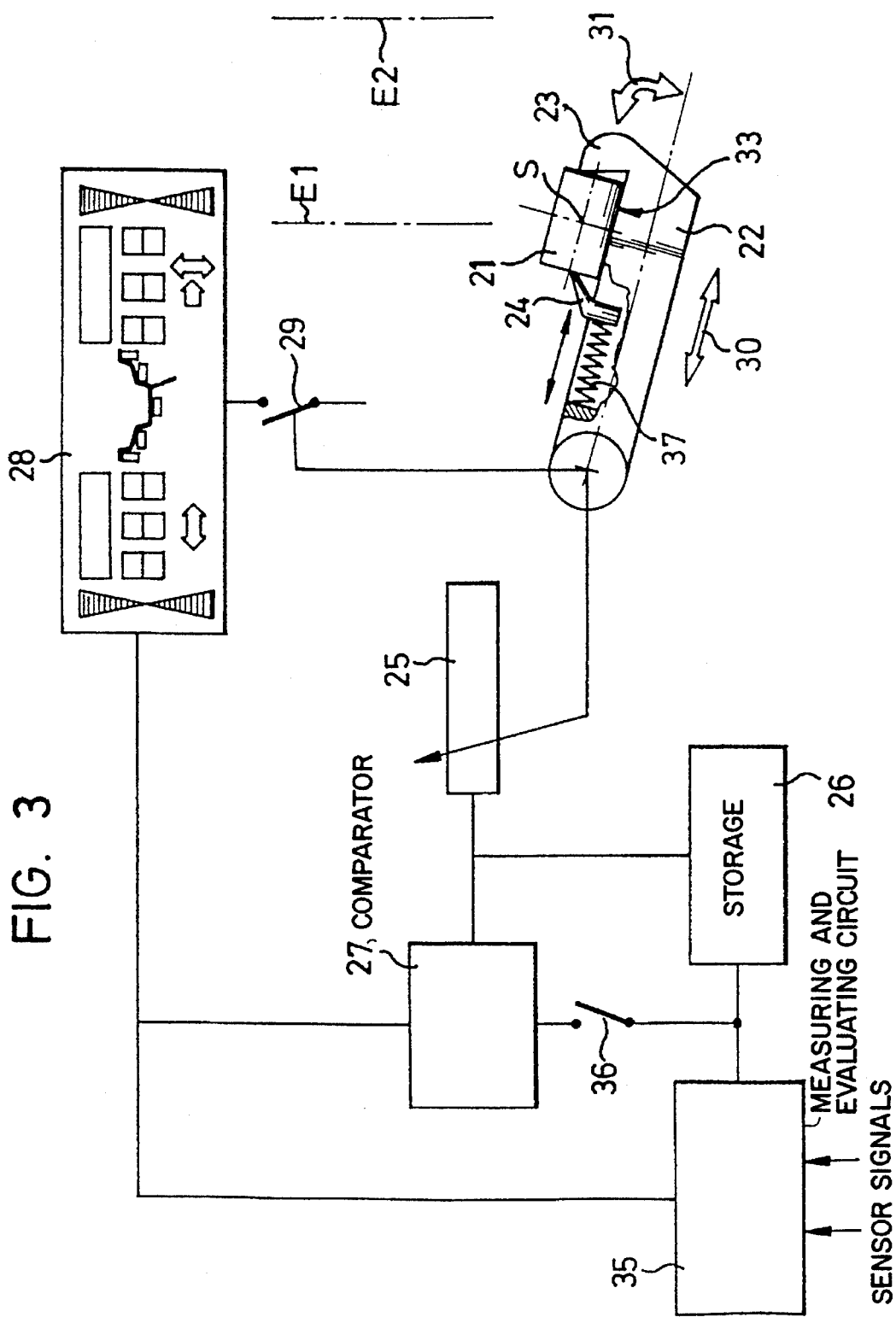
FIG. 3 shows a block circuit diagram of a diagrammatically illustrated sensing apparatus with an evaluating system connected thereto.

An embodiment of the method according to the invention for unbalance compensation on a motor vehicle wheel will now be described. Looking therefore at FIG. 3, diagrammatically shown therein is a sensing apparatus in the form of a sensing finger 22 with a sensing tip 23. The sensing finger 22 can be extended or moved in the direction indicated by the double-headed arrow 30 and can also be pivoted as indicated by the double-headed arrow 31. For the pivotal movement, the sensing finger 22 can additionally be pivotably mounted to the sensing head 10 shown in FIG. 1 so that it can be pivoted out of its position in which it is oriented parallel to the main shaft 2 of the balancing machine, for example for fitting weights such as adhesive weights to inclined rim surfaces.

For position detection purposes the sensing finger 22 is connected to a position detection device 25. The position detection device 25 generates electrical position detection signals which are proportional to the respective extension length of the sensing finger 22 or which are proportional to a movement over the distance w (double-headed arrow 30) and the pivotal position (double-headed arrow 31) of the sensing finger 22. The signals which are outputted by the position detection device 25 are proportional to the respective positioning of the sensing tip 23 of the sensing finger 22. By way of example, a detailed description of a sensing apparatus which can be used in this respect, with position detection, is to be found in above-mentioned German patent application No P 41 22 844 corresponding to U.S. patent application Ser. No. 07/910,917. It is also possible to use the above-described sensing apparatus with measuring device for position detection purposes. The position detection device may include a potentiometer for detecting the pivotal position as indicated by the double-headed arrow 31 in FIG. 3 and a potentiometer for detecting the length of movement parallel to the main shaft 2 of the balancing machine, as indicated by the double-headed arrow 30. The analog signals generated by the potentiometers can be stored after digitization.

The illustrated sensing apparatus can be used not only for sensing a disk wheel, more specifically in the rim region thereof, in the sensing mode, but in the retrieval mode it also serves to facilitate arranging at least one balancing weight in the correct position on the wheel after the unbalance measuring operation has been carried out, as will be described in greater detail hereinafter.

For that purpose, as shown in FIG. 3, connected to the output of the position detection device 25 is a storage device or memory 26. The storage device 26 is a component of the electronic measuring or evaluation system 35, a suitable form of which is described for example in Hofmann-News 5, imprint 09.85D to which reference is therefore suitably directed. The system 35 assesses and evaluates measurement sensor signals which are obtained in the unbalance measuring operation, in the measuring runs. The evaluated measurement sensor signals are then displayed in the form of information in respect of magnitude and angular position for the balancing weights to be fitted to the wheel to be balanced, the display being at a suitable form of display device 28. Connected both to the storage device 26 and the position detection device 25 is a comparator 27 which is in turn connected to the display device 28.

Figure 4A:
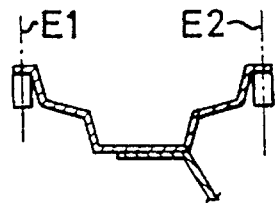
FIGS. 4(A)–4(F) show various balancing modes for correcting unbalance, as can be represented by the evaluating system.
Figure 4B:
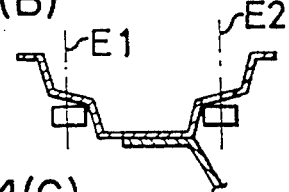

As can be seen from FIG. 3 the sensing finger 22 has a weight holder 24 in the form of a gripping claw, which is subjected to the force of a coil compression spring 37 urging the weight holder 24 towards the spring tip 23, for holding a balancing weight 21 on the sensing finger 22 between the claw and the sensing tip 23. Before an unbalance measuring procedure is carried out, the rim portion of a motor vehicle wheel to be balanced is sensed in the regions of the balancing planes diagrammatically indicated by broken lines E1 and E2 in FIG. 3 and also shown in relation to rim portions in for example FIG. 4. The balancing planes E1 and E2 are the planes in which at least one balancing weight is to be disposed if unbalance of the wheel is to be corrected. To take an example in this respect, reference may be made to FIG. 5A showing an operation of sensing a wheel rim 32 when the wheel to be balanced is for example a standard motor vehicle wheel with an alloy rim, to which at least one adhesive weight is to be fitted. In that respect, it must be borne in mind that the sensing tip 23 does not precisely coincide with the center of gravity as indicated at S of the balancing weight 21 to be fitted. However, to provide for accurate balancing, the center of gravity S must be disposed in the respective balancing plane E1 or E2. In order to provide for accurate sensing here, a balancing weight 21 acting as a reference weight is fitted into the sensing finger 22 and held in position thereon by means of the weight holder 24. The dimensions of the fitted reference weight 21 and the position of the center of gravity S thereof, in particular the distance of the center of gravity from the support edge indicated at 33 in FIG. 3 and the spacing of the center of gravity S from the sensing tip 23, are known parameters. Different dimensions in respect of the balancing weights themselves in the direction as indicated by the arrow 30 in FIG. 3 and displacement of the center of gravity S in that direction can be ascertained by means of a sensing device as illustrated in FIG. 7, and communicated to the position detection device 25. The above-indicated dimensions and parameters are to be taken into consideration in the detect ion device 25, in order to provide for correct positioning of a balancing weight to be fitted in a respective plane. Reference may be made in this respect to German laid-open application (DE-OS) No 27 37 524 disclosing a suitable method of taking account of the above-mentioned dimensions and parameters in the detection device 25.

Figure 4C:
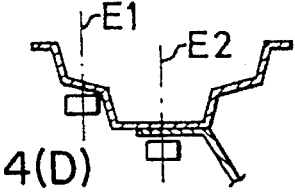
Figure 5A:
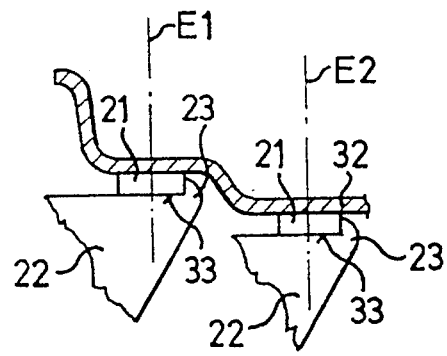
FIGS. 5(A)–5(E) show various possible forms of sensing motor vehicle wheel rims.

In the event for example that a balancing mode as shown in FIG. 4(C) is to be used, it is possible to provide for appropriate sensing of the balancing planes E1 and E2. The corresponding positions of the sensing finger 22 are detected by the detection device 25 and proportional signals in digital form are thus inputted into the storage device 26. Those data which specify the positions of the balancing planes E1 and E2 as well as the radii of the positions of the balancing weights in the balancing planes E1 and E2 are also taken into consideration in the course of the operation of evaluating the measuring sensor signals supplied during the unbalancing measuring operation by the measuring sensors (not shown), in the electronic measuring and evaluation apparatus 35.

Figure 5B:
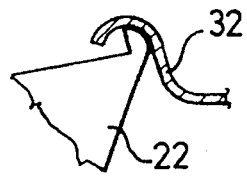
Figure 5C:
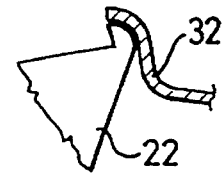
Figure 5D:
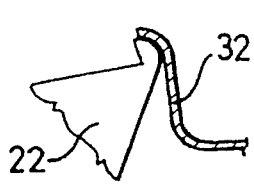
Figure 5E:
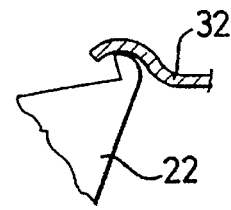

When dealing with standard wheels with steel rims, for example, the rim sensing procedure shown in FIG. 5(B) is used. When dealing with standard wheels with alloy rims on the other hand for example the wheel rim sensing procedure shown in FIG. 5(C) can be used. When dealing with shallow-bed or deep-bed rims for example the sensing procedure shown in FIG. 5(D) can be employed while when dealing with steel rims on steep-shoulder wheels for example the sensing procedure shown in FIG. 5(E) can be used.

It will be noted that the sensing procedures shown in FIGS. 5(B) through (E) are the sensing procedures involved in the left-hand balancing planes E1. The position of the right-hand balancing plane can be ascertained by means of the measuring sensor according to the present invention.

It will also be noted that the balancing weight which is used for sensing the rim in FIG. 5(A) can be an adhesive weight which is applied, with the protective foil covering the adhesive layer facing upwardly, to the support surface 33 of the sensing finger 22. The sensing tip 23 with the inserted balancing weight 21 is held in the sensing position for a certain period of time, for example two seconds, in order to give sufficient time for the recorded measurement values to be passed into the storage means 26. That stoppage period can be adjusted as required.

If certain balancing modes involve positioning of the balancing weights in given planes on the rim, the operation of sensing the rim dimensions can be further facilitated from the point of view of the machine operator. Reference can now be made to FIG. 4 which shows a number of different balancing modes for standard rims.

Thus, FIG. 4(A) shows normal weight positioning on the rim flange or bead portions. The weights involved are generally spring-type weights which are clamped into the rim flange or bead portions.

FIG. 4(B) shows the symmetrical fitting of adhesive weights to rim shoulders.

FIG. 4(C) shows the fitting of adhesive weights, with a concealed weight being mounted in the rim dish portion in order not to be detrimental to the attractive appearance of the vehicle wheel, more particularly an alloy wheel.

Figure 4D:
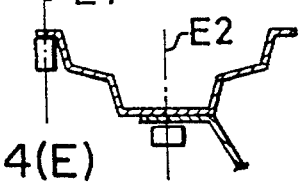

In the case of the balancing mode shown in FIG. 4(D), a spring-type weight is fitted to the left-hand rim or bead portion while an adhesive weight is fitted in the rim dish.

Figure 4E:
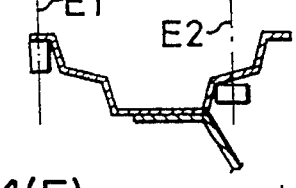

In the balancing mode shown in FIG. 4(E), a spring-type weight is fitted to the left-hand rim flange or bead portion while an adhesive weight is fitted to the right-hand rim shoulder.

Figure 4F:
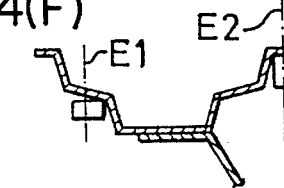

In the balancing mode shown in FIG. 4(F), a spring-type weight is fitted to the right-hand rim flange or bead portion and an adhesive weight is fitted to the left-hand rim shoulder.

The above-indicated possible balancing modes which can be used for suitable positioning of the respective balancing weights can be displayed at the display unit indicated at 28 by reproduction of the rim symbols shown in FIG. 4, with the balancing planes E1 and E2 identified by diagrammatically illustrated balancing weights. The various balancing modes or weight positions as indicated in FIGS. 4(A) through (F) can be displayed separately. The balancing planes E1 and E2 which are to be sensed by means of the sensing finger 22 can then be identified by visual identification, for example by flashing of the weight symbols which specify the positions of the balancing lanes E1 and E2. The operator then knows what locations on the rim of the wheel to be balanced are to be sensed with the sensing finger 22. The display unit 28 only ever flashes one weight symbol which indicates the balancing plane to be sensed on the vehicle wheel. When that balancing plane has been sensed and the corresponding data have been stored in the storage means 26, the weight symbol in respect of the second balancing plane then flashes.

The above-indicated mode of operation, as shown in FIG. 6, is brought into effect by operating a switch as indicated at 29 in FIG. 3. The switch 29 is closed and causes flashing of the appropriate weight symbol, when the sensing finger 22 is moved out of its rest position.

Reference will now be made to FIG. 6 to describe the mode of operation involved in retrieval of the balancing planes E1 and E2 which had been previously ascertained in the sensing mode, this phase of operation being referred to as the retrieval mode. Reference will be made to the balancing mode shown in FIG. 4(C) for the purposes of this description.

A balancing weight 21 which is in the form of an adhesive weight is fixed to the sensing finger 22 by means of the spring-loaded holding device 24 between the gripping claw and the upwardly bent sensing tip 23, and the protective foil 34 which covers the layer of adhesive on the top of the balancing weight 21 is removed, as shown in FIG. 6(A). The sensing tip 23 is moved to the rim 32, the spacing of the sensing finger 22 from the respective balancing plane E1 or E2 being displayed at the display unit 28. As soon as the balancing weight 21 or the center of gravity S thereof is moved into one of the two planes, for example the left-hand balancing plane E1 as illustrated, an acoustic signal sounds, to indicate to the operator that the weight has been moved into the appropriate balancing plane. At the same time a spacing display zero is shown on the display, corresponding to the position shown in FIG. 6(B).

The adhesive weight is then moved towards the rim 32 and pressed thereagainst, by means of the weight holding device 24. The sensing finger 22 is released from the balancing weight 21 which now adheres to the rim 32, and moved back into its starting position.

In that starting position a second balancing weight 21 is fixed to the sensing finger 22 of a second measuring sensor and the same procedure is repeated for fitting the balancing weight 21 in the right-hand balancing plane E2. As can be seen from FIGS. 6(B) and (C), the balancing weights 21 are fixed to the rim 32 in positions such that their centers of gravity S are disposed in the previously detected balancing planes E1 and E2.

A switch as indicated at 36 can be actuated for initiating the retrieval mode in respect of the respective balancing plane, in the balancing procedure. The switch 36 can be actuated manually or alternatively automatically by means of a procedural program or by a given control movement of the sensing finger 22.

FIG. 7 shows a sensing apparatus for sensing the dimensions of the balancing weight 21 in the extension direction or in the direction of movement of the sensing finger 22, as indicated by the arrow 30. The balancing weight is clamped between the sensing tip 23 and the holding device 24 by the force of the spring 27. A fixing pin 42 is fixed to the holding device 24 which is displaceable on the sensing finger 22 in the axial direction thereof. Fixed to the pin 42 is a cord 41 or a pull wire which is connected to a potentiometer for ascertaining the extension length or travel length in the position detection device 25. If the axial dimensions of the balancing weight 21 change, the center of gravity S is also correspondingly displaced. That phenomenon can be taken into consideration by virtue of the illustrated sensing apparatus. In that situation, the respective displacement of the center of gravity S is half the respective variation in dimension as between the holding device 24 and the sensing tip 23. In the embodiment illustrated in FIG. 7, the pin 42 is rigidly connected to the holding device 24. It is however also possible for the pin 42 to be in the form of a lever which is correspondingly pivoted in dependence on the dimension of the balancing weight. That pivotal movement is then also transmitted to the cord or wire 41. In that arrangement, the transmission ratio of the lever assembly can be so selected that the above-mentioned displacement of the center of gravity, which corresponds to half the respective variation in dimension in the axial direction, is taken into account mechanically. When the device has a rigid pin, that aspect can be taken into consideration by means of a suitable computing operation in the electronic evaluation system or in the position detection device 25.

It will be appreciated that the above-described apparatus and methods according to the present invention have been set forth solely by way of example and illustration of the principles of the invention and that various modifications and alterations may be made therein without thereby departing from the spirit and scope of the invention.

What is claimed is:

1. A balancing machine comprising:
    a frame on which a rotatably mounted main shaft is rotatably mounted and to which a rotary member to be balanced is removably attached;
    a support bar mounted to said frame and positioned parallel to said main shaft, said support bar being fixed in its longitudinal direction; and
    an apparatus for sensing geometrical data of the rotary member, said apparatus comprising a measuring sensor for generating a sensing signal in a sensing operation, said measuring sensor being rotatably arranged on said support bar about the longitudinal axis thereof, said measuring sensor including
        a pivot head mounted on said support bar to be movable about the longitudinal axis of the support bar,
        a measuring sensing lever mounted pivotably connected to said pivot head, said lever including a sensing head, said sensing head further including a sensing finger having a longitudinal axis, said finger being moveable toward and away from said rotary member upon pivotal movement of said lever so that the axis of said finger is maintained in a parallel orientation with respect to an axis of said main shaft, and
        an angle measuring means for detecting a pivotal angle of said lever relative to said pivot head.

2. A balancing machine as set forth in claim 1 and further including:
    a guard hood pivotally connected to said machine so that it can in one pivoted position cover the rotary member;
    wherein a longitudinal axis of the support bar and an axis of rotation of the guard hood are the same.

3. A balancing machine as set forth in claim 1 including means for fixing the pivot head on the support bar in the longitudinal direction.

4. A balancing machine as set forth in claim 1 wherein the measuring sensor has a resetting means for resetting the pivoted measuring sensing lever.

5. A balancing machine as set forth in claim 4 wherein the resetting means includes at least one spring for producing a resetting force which resets the pivoted measuring sensing lever.

6. A balancing machine as set forth in claim 1 wherein the measuring sensor has a resetting means for resetting the pivot head.

7. A balancing machine as set forth in claim 6 wherein the resetting means includes at least one spring for producing a resetting force which resets the pivot head.

8. A balancing machine as set forth in claim 1 wherein the angle measuring means has a potentiometer, a toothed gear for actuating the potentiometer, and an arcuate toothed segment coupled to the measuring sensing lever for driving the toothed gear of the potentiometer.

9. A balancing machine as set forth in claim 1 wherein angle measuring means has a measuring means for determining the rotary movement of the pivot head about the longitudinal axis of a support bar.

10. A balancing machine as set forth in claim 1 including drive means for rotating the pivot head and for pivoting the measuring sensor lever on the measuring sensor drive, and a control means for operating the drive means.

11. A balancing machine as set forth in claim 1 wherein the sensing finger has a holder for a balancing weight.

12. A balancing machine as set forth in claim 1 wherein:
    the rotary member is a wheel; and
    the measuring sensor is arranged near a main body structure of the balancing machine and is for measuring a left-hand side, which is most proximate said main body structure, of a rim of the wheel which is clamped on the machine.

13. A balancing machine as set forth in claim 1 wherein:
    the rotary member is a wheel; and
    the measuring sensor is arranged on a main body structure of the wheel balancing machine and is for measuring a right-hand side, which is most remote from said main body structure, of a rim of the wheel which is clamped on the machine.

14. A balancing machine as set forth in claim 1 wherein:

said rotary member is a wheel, a first measuring sensor is arranged near a main body of the balancing machine for measuring a left-hand side, which is most proximate said main body structure, and a second measuring sensor is arranged on a right-hand side, which is most remote from said main body structure, of the rim of the wheel which is clamped on the machine for measuring a side of the wheel rim opposite a side measured by said first measuring sensor.

15. A balancing machine as set forth in claim 1 wherein the measuring sensing lever is in the form of first and second at least substantially parallel pivotal arms which are mounted in a parallelogram assembly on the pivot head and the sensing head for guidance of the sensing finger at least substantially parallel to said main shaft.

16. A balancing machine as set forth in claim 1 wherein the measuring sensing lever has a Bowden cable arrangement for guidance of the sensing finger at least substantially parallel to said main shaft.

17. A balancing machine as set forth in claim 1 wherein the measuring sensing lever has a cable and a spring for guidance of the sensing finger at least substantially parallel to said main shaft.

18. A balancing machine as set forth in claim 1 wherein the measuring sensing lever has a pushrod and a spring for guidance of the sensing finger at least substantially parallel to said main shaft.

19. A balancing machine as set forth in claim 1 wherein the support bar is hollow for accommodating connecting lines of the angle measuring means.

20. A method of compensating unbalance of a motor vehicle wheel by use of a balancing apparatus, the apparatus having a main shaft carrying the wheel, a support bar and a sensing apparatus coupled to an electronic measuring and evaluation system, the sensing apparatus having a measuring sensor comprising a pivot head arranged on the support bar, the support bar being fixed in a longitudinal direction thereof, the pivot head being rotatable about a longitudinal axis of the support bar, a measuring sensor lever having a positively guided sensing head, the measuring sensing lever being mounted pivotably on the pivot head and the sensing head carrying a sensing finger adapted to be moved towards and away from the wheel to be sensed upon pivotal movement of the measuring sensing lever in parallel orientation with respect to the main shaft, and an angle measuring means arranged at the pivot head to detect the pivot angle of the measuring sensing lever with respect to the pivot head, the method comprising:

sensing at least one wheel dimension with the sensing apparatus;

storing the sensed wheel dimension in the electronic measuring and evaluation system;

performing an unbalance measuring operation and using the electronic measuring and evaluation system to determine a position on the wheel to place a balance weight; and using the sensing apparatus to fix a balance weight to the wheel at the determined position.

21. A method as set forth in claim 20 wherein the respective balancing plane in which the balancing weight is fitted for unbalance compensation is sensed with the sensing apparatus for measurement value evaluation and the corresponding balancing plane position is stored in the electronic measuring system, and wherein for retrieval of the respective balancing plane when fitting the balancing weight to the wheel the sensing apparatus is moved and in that operation the distance of the sensing apparatus from the respective balancing plane is displayed.

22. A method as set forth in claim 21 wherein a signal is produced by the electronic measuring system when the respective balancing plane in which the balancing weight is to be fitted is reached.

23. A method as set forth in claim 20 wherein for sensing the balancing plane and the effective diameter of the fitted balancing weight, for measurement value evaluation, the internal dimension (internal diameter) of the wheel is sensed in the respective balancing plane with a balancing weight disposed between the sensing apparatus and the internal dimension of the wheel.

24. A method as set forth in claim 20 wherein a rim cross-section with the respective possible balancing planes is displayed by a display device connected to the electronic measuring system, wherein a respective balancing plane intended for a selected balancing mode is indicated by a signal during the sensing operation, and wherein the display is erased after sensing of the displayed balancing plane on the wheel to be measured.

25. A method as set forth in claim 24 wherein the display of the balancing plane to be sensed on the wheel begins when the sensing apparatus is moved out of its rest position.

26. A method as set forth in claim 24 wherein to effect dynamic unbalance compensation, first and second balancing planes to be sensed are displayed in succession.

27. A method as set forth in claim 20 wherein the sensing apparatus is fixed in its respective sensing position.

28. A method as set forth in claim 27 wherein the sensing apparatus is manually fixed.

29. A method as set forth in claim 27 wherein the sensing apparatus is fixed under the control of the electronic measuring system.

30. A method as set forth in claim 27 wherein when the sensing apparatus is fixed the wheel is turned into the angular position for balancing thereof.

31. A method as set forth in claim 20 and including the step of switching over the procedure between a sensing mode and a retrieval mode.

32. A method as set forth in claim 20 wherein a balancing weight is fitted into the sensing apparatus both in a sensing mode and in a retrieval mode and the position of the center of gravity of the balancing weight, being the position which is operative in the unbalance compensation operation, is used when sensing and retrieving the appropriate balancing plane.

33. Apparatus for unbalance compensation on a motor vehicle wheel for carrying out a method as set forth in claim 20 comprising a position detection means coupled to the sensing apparatus, a memory means connected to the position detection means, a comparison means connected to the memory means and the position detection means, and a display means connected to the comparison means.

* * * * *